United States Patent Office 3,048,011
Patented Aug. 7, 1962

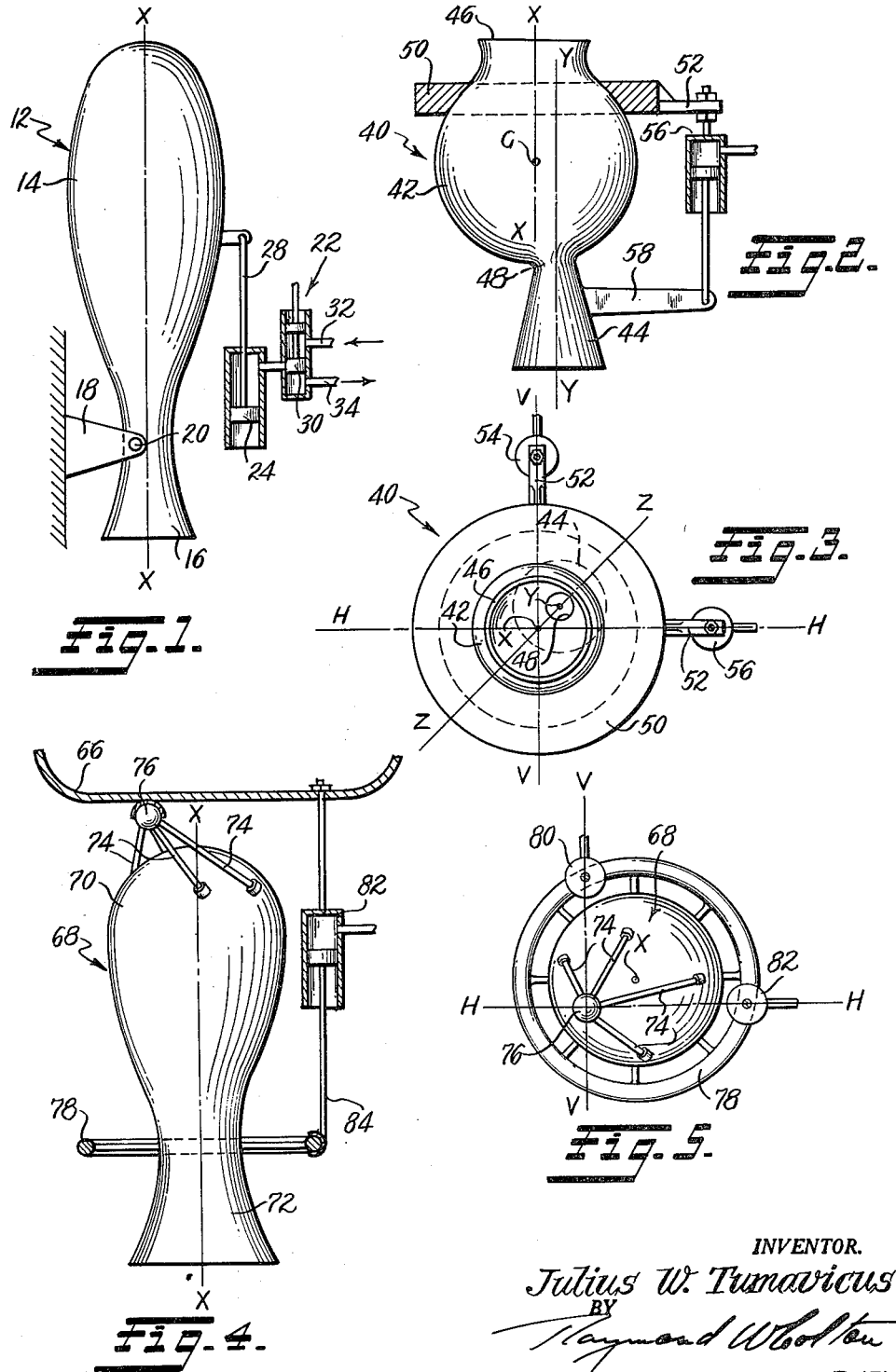

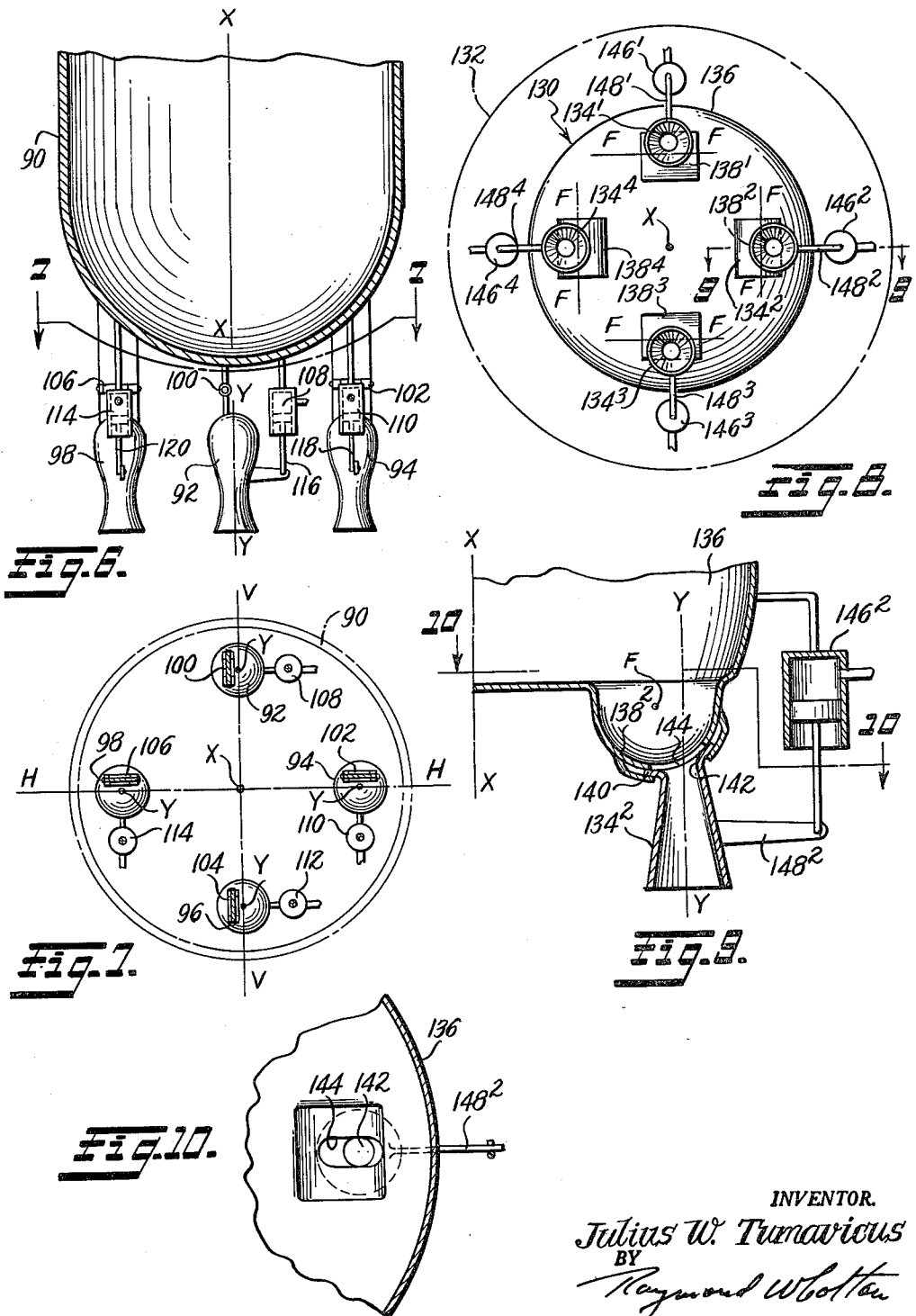

3,048,011
DIRIGIBLE REACTION MOTOR
Julius W. Tumavicus, Old Saybrook, Conn., assignor to United Aircraft Corporation, East Hartford, Conn., a corporation of Delaware
Filed Apr. 22, 1960, Ser. No. 24,142
13 Claims. (Cl. 60—35.55)

The present invention relates to the steering of reaction motors, and more specifically to a novel steering arrangement for a reaction motor in which the actuator is always loaded in only one direction, resulting in a much simpler construction, greater sensitivity, and a considerable saving in weight.

In the use of reaction motors as propulsion means for guided missiles, or as prime movers for propelling a payload or a vehicle, it is often desirable to provide reaction means to effect a steering of the reaction motor to control the direction of thrust. Various arrangements have been suggested, most of which involve the use of deflectors disposed in the effluent from the nozzle, or the use of separate steering nozzles, or the use of tiltable nozzles. The second of these arrangements requires the addition of auxiliary steering nozzles and valves to control the flow of gases, which necessitates considerable additional weight and control elements. The other two arrangements require the use of double-acting actuators or motors, involving an increased complexity of the control conduits or wiring, and a consequent increase in weight. In reaction propulsion motors in general, and particularly in rocket motors that must carry their fuel and oxidizer as well, weight is one of the most important factors, and any improvement that results in a saving of weight permits the use of additional fuel and oxidizer and a consequent longer range of flight.

It is an object of the invention, therefore, to provide a novel steering arrangement for a reaction propulsion motor that is simple in construction and effects a saving in weight.

It is a further object to provide a novel steering arrangement for a reaction propulsion motor in which the steering actuator is always loaded in one direction whereby a single acting actuator may be employed.

It is a further object to provide a novel steering arrangement for a reaction propulsion motor in which the motor is mounted on a universal joint displaced from the axis of thrust, and in which a pair of single action actuators provide directional steering in two planes at right angles to each other.

The above and other objects will become apparent from a consideration of the following specification taken with the accompanying drawings, in which:

FIG. 1 is a diagrammatic representation of one embodiment of the invention in which a symmetrical reaction motor is pivotally supported on a transverse axis offset relative to the thrust axis;

FIG. 2 is a diagrammatic representation of a second embodiment of the invention in which the nozzle thrust axis is offset relative to the axis of the combustion chamber;

FIG. 3 is a forward end view of the reaction propulsion motor of FIG. 2;

FIG. 4 is a diagrammatic representation of a third embodiment of the invention in which a reaction propulsion motor is universally mounted on a support offset relative to the axis of thrust;

FIG. 5 is an end view of the reaction propulsion motor of FIG. 4 looking down from the support;

FIG. 6 is a diagrammatic representation of a fourth embodiment of the invention in which a cluster of reaction propulsion motors are mounted on a vehicle, each motor being pivotally mounted on an axis offset relative to the thrust axis of the motor;

FIG. 7 is an end view of the embodiment of FIG. 6 taken on the line 7—7 of FIG. 6;

FIG. 8 is a diagrammatic representation of a fifth embodiment of the invention in which a single reaction propulsion motor is provided with a cluster of pivotally mounted nozzles, each nozzle mounted on an axis which is offset relative to the axis of thrust;

FIG. 9 is a longitudinal sectional view through one of the nozzles taken on the line 9—9 of FIG. 8; and FIG. 10 is a fragmentary transverse sectional view through the reaction propulsion motor on the line 10—10 of FIG. 9.

FIG. 1 diagrammatically illustrates a first embodiment of the invention, in which the numeral 12 designates a reaction propulsion motor, which may be a rocket, turbojet, ramjet or pulse jet type of motor, having a combustion chamber 14 and a reaction nozzle 16. The longitudinal axis of the combustion chamber 14 and the thrust axis of the nozzle 14 are coaxial along the line X—X.

The reaction propulsion motor 12 is mounted on a bracket or the like 18 attached to a body to be propelled, being pivotally supported thereon by a hinge pin 20 having its axis transversely disposed relative to the axis X—X and laterally offset thereto. While, as shown in the drawing, the hinge pin 20 supports the reaction propulsion motor adjacent the throat of the nozzle, it should be understood that the hinge pin may be connected with a wall of the nozzle or with a wall of the combustion chamber.

From the foregoing, it is evident that a reaction thrust along the axis X—X will result in a counterclockwise rotation of the reaction propulsion motor 12 about the axis of the hinge pin 20. Advantage is taken of this operation to control the direction of the thrust of the nozzle for steering, and for this purpose an actuator 22, which may be supported by the same body to which the bracket 18 is attached, is pivotally connected with the reaction propulsion motor by a connection 28. The actuator 22 may be any well known type of fluid or electrically operated servomotor, or a manual operator. In the embodiment illustrated, a fluid operated servomotor is shown, comprising a cylinder having a piston 24 attached to the connection 28. A pilot valve 30 regulates the pressure fluid on one face of the piston, the fluid being delivered by a source of pressure 32 and discharged by duct 34. The connection 28 may be attached to the reaction propulsion motor at the combustion chamber wall, as shown, or at the nozzle wall. As illustrated, the connection 28 is laterally offset relative to the axis X—X, being disposed on the side opposite the hinge pin 20, but it is evident that the connection could be made at a point along the axis X—X, or at a point on the reaction propulsion motor on the same side of the axis X—X occupied by the hinge pin 20 but farther from the axis.

In operation, a thrust along the axis X—X will result in a tendency for the reaction propulsion motor to rotate counterclockwise about the axis of the hinge pin 20, which tendency is restrained by the actuator 22. The actuator is always loaded in the same direction, that is, the connection 28 is always in tension. The servomotor 24, therefore, can be single acting, in which the pressure fluid acts on only on side of the piston 24. The thrust of the reaction propulsion motor is transmitted to the body to be propelled or payload through the actuator 22 and the bracket 18, and steering is effected by shifting the pilot valve 30, directly or remotely, to admit pressure fluid to or to exhaust pressure fluid from the closed end of the servomotor. The admission of pressure fluid to the servomotor produces a movement of the piston 24 toward the bottom, causing a clockwise movement of the axis X—X and a resultant change in the direction of the thrust. Likewise, the exhaust of pressure fluid from the servomotor permits the rotational tendency of the reaction propulsion motor about the axis of the hinge pin 20 to cause an upward movement of the connection 28 and the piston 24 of the servomotor, effecting a counterclockwise rotation of the axis X—X of the reaction propulsion motor and a consequent change in the direction of the thrust. It should be understood that appropriate hinked linkages are provided in the connection 28 to permit relative movement.

In the embodiment shown in FIGS. 2 and 3, the reaction propulsion motor is designated by the numeral 40, and comprises a combustion chamber 42, a main reaction nozzle 44 at the rear end, and an air inlet 46 at the forward end. This embodiment represents a diagrammatic showing of a ramjet or pulse jet type of reaction propulsion motor employing atmospheric air as the oxidizer, and using liquid or solid fuel. The fore and aft axis of the combustion chamber 42 is shown by the line X—X, and the thrust axis of the reaction nozzle is shown by the line Y—Y. The lines X—X and Y—Y are parallel, but are not coaxial as in the first embodiment. As a result of the offset arrangement of these axes, the reaction thrust of the nozzle will result in a turning moment about the axis X—X. Advantage is taken of this phenomenon to effect steering of the reaction propulsion motor.

As shown in FIG. 2, the combustion chamber 42 is spherical in exterior outline, but, for the purpose of this invention, only the upper end thereof may be spherical, or the combustion chamber may be made of any form and a separate ball-and socket joint may be provided for swivelly mounting the motor. A ball-and-socket joint is provided, which employs a socket 50, which may be attached to the body to be propelled to support the reaction propulsion motor 40, and the spherical end of the combustion chamber forms the ball, which is mounted for universal movement about the center C (FIG. 2) along the fore and aft axis X—X. With reference to FIG. 3, which illustrates the offset portion of the throat 48 of the nozzle 44 relative to the fore and aft axis X—X, an axial thrust along the line Y—Y will tend to produce rotation around the center C.

The socket 50 rigidly supports a pair of radial arms 52, which are disposed 90° apart and are spaced the same distance on opposite sides of a line Z—Z passing through the axes X—X and Y—Y. These arms support a pair of actuators 54 and 56, which are pivotally attached to a pair of connections 58 fastened to a wall of the nozzle 44. The points of attachment of the connections 58 with a wall of the nozzle 44 are spaced 90° apart and correspond to the positioning of the arms 52.

The actuators 54 and 56 are shown as single acting servomotors, and may be selectively operated to effect steering of the reaction propulsion motor in any direction. The actuators 54, 56 and the ball-and-socket joint provide a three point support in which a line V—V passing through the axis of the actuator and point C on the one hand, and a line H—H passing through the axis of the actuator 56 and point C on the other hand, form a 90° angle, and the line Z—Z bisects this angle. By maintaining the actuator 56 fixed, the actuator 54 can be operated to effect rotation of the reaction propulsion motor about the axis H—H in FIG. 3. Similarly, by maintaining the actuator 54 fixed, the actuator 56 can be operated to effect rotation of the reaction propulsion motor 40 about the axis V—V in FIG. 3. Consequently, by operating both the actuators 54 and 56, steering in any direction can be accomplished, in which the ball-and-socket joint serves as a universal connection permitting freedom of movement of the reaction propulsion motor.

A third embodiment of the invention is illustrated in FIGS. 4 and 5, in which the numeral 66 designates the rear end of a vehicle driven by a reaction propulsion motor 68 having a combustion chamber 70 and a reaction nozzle 72. The longitudinal axis of the combustion chamber 70 and the thrust axis of the nozzle 72 are coaxial along the line X—X, which represents the axis of thrust of the reaction motor, and, if a single reaction motor is utilized, this axis should coincide with the fore and aft axis of the vehicle for stability.

The motor 68 is mounted by the four struts 74, which mounting is pivotally supported by a ball-and-socket joint 76 attached to the vehicle 66 to provide a universal mounting laterally offset relative to the fore-and-aft axis thereof. A steering ring 78 is attached to the nozzle 72 in a plane transverse of the longitudinal axis X—X.

Steering is effected by a pair of actuators 80 and 82 carried by the vehicle 66. Each actuator includes a single acting servomotor, the piston of which operates a connection 84 pivotally attached to the ring 78.

As shown in FIG. 5, a line H—H connecting the center of actuator 82 and the center of the ball-and-socket joint 76 may be considered a first axis that is transverse of the axis X—X, and a line V—V connecting the center of actuator and the ball-and-socket joint 76 may be considered a second axis that is transverse of the axis X—X. It should be noted that these two transverse axes H—H and V—V are at right angles to each other, and that they are both laterally offset relative to the longitudinal axis X—X, so that a thrust along the axis X—X will have a tendency to rotate the motor about the transverse axes H—H and V—V, and also about the ball-and-socket joint. By retaining the actuator 82 inoperative, the actuator 80 can be operated to effect rotation of the reaction propulsion motor about the first transverse axis H—H, and similarly, by retaining the actuator 80 inoperative, the actuator 82 can be operated to effect rotation of the reaction propulsion motor about the second transverse axis V—V. By controlling the two actuators 80 and 82, therefore, the vehicle can be steered in any direction.

A fourth embodiment of the invention is shown in FIGS. 6 and 7, in which a vehicle 90 is propelled by four reaction propulsion motors 92, 94, 96 and 98 disposed 90° apart in a circle around the fore and aft axis X—X of the vehicle.

Each reaction propulsion motor includes a combustion chamber and reaction thrust nozzle, the arrangement being such that the longitudinal axis of the combustion chamber and the thrust axis of the nozzle are coaxial along the axis Y—Y.

The reaction propulsion motors 92, 94, 96 and 98 are pivotally attached to the rear end of the vehicle 90 by hinged supports 100, 102, 104 and 106, respectively, each support permitting movement of its reaction propulsion motor in a single plane, and each support being laterally offset relative to the longitudinal axis Y—Y of the respective reaction propulsion motor, whereby the axial thrust of each motor causes a tendency to rotate the motor about the hinged support. The vehicle also carries a series of actuators 108, 110, 112 and 114 which are connected to the motors 92, 94 and 98 by pivotal connections 116, 118 and 120, respectively, and by a similar connection, not shown, to the motor 96.

Referring to FIG. 7, it will be observed that the axes Y—Y of the motors 98 and 94 lie in a first plane H—H that includes the axis X—X, and that the axes Y—Y of the motors 92 and 96 lie in a second plane V—V that also includes the axis X—X, and that the planes H—H and V—V are at right angles to each other. It will also be observed that the axes of the hinged supports 100 and 104 are coaxial and that they both lie offset relative to the axis V—V. Likewise, the axes of the hinged supports 102 and 106 are coaxial and both are offset relative to the axis H—H. There is, therefore, a tendency for the motors to rotate about their hinged supports, which tendency is restrained by the single acting actuators.

The actuators 108, 110, 112 and 114 may be independently operated, or they may be paired, that is to say, the actuators 108 and 112 may be connected for simultaneous actuation, and the actuators 110 and 114 may be similarly connected. Operation of the actuators 108 and 112 is effective to produce steering about the second axis V—V, and operation of the actuators 110 and 114 is effective to produce steering about the first axis H—H. By appropriate operation of the actuators, steering can be had in any direction, and if desired, a spin around the axis X—X can be effected.

FIGS. 8, 9 and 10 illustrate a fifth embodiment of the invention, in which the numeral 130 designates a reaction propulsion motor which can be attached to the rear end of a vehicle 132. In the case of a single reaction propulsion motor, the longitudinal axis X—X of the reaction propulsion motor should coincide with the fore and aft axis of the vehicle to assure stability.

The reaction propulsion motor 130 comprises a combustion chamber 136 having four reaction nozzles $134'$, $134^2$, $134^3$ and $134^4$ arranged 90° apart in a circle about the axis X—X. Each nozzle is pivotally mounted on a transverse joint 138 in the form of a cylinder having its axis at F, and the inner end of the nozzle has a semi-cylindrical joint 140 for sliding movement on the transverse joint 138. The throat of the nozzle is indicated at 142, and registers with a slot 144 in the outlet from the combustion chamber.

With reference to FIG. 9, it will be observed that the thrust axis Y—Y of each nozzle is offset relative to the transverse axis F of the joint, and that the reaction thrust along the axis Y—Y is effective to cause a tendency for the nozzle to rotate around the axis F. As shown in FIG. 8 in broken lines, the axes F—F of the cylindrical joints $138'$ and $138^3$ are parallel with each other, and the axes F—F of the cylindrical joints $138^2$ and $138^4$ are also parallel with each other and at right angles to the axes of the cylindrical joints $138'$ and $138^3$.

The vehicle 132 carries four actuators $146'$, $146^2$, $146^3$ and $146^4$, which are single acting, and operate, through appropriate connections $148'$, $148^2$, $148^3$ and $148^4$, the nozzles $134'$, $134^2$, $134^3$ and $134^4$, respectively.

In operation, either one or both of the actuators $146'$ and $146^3$ may be operated to effect steering about a first axis normal to the axis X—X of FIG. 8, and similarly, either one or both of the actuators $146^2$ and $146^4$ may be operated to effect steering of the vehicle about a second axis normal to the axis X—X. Thus, by appropriate operation of the four actuators, steering in any direction can be obtained.

The pivotal axes F—F of the cylindrical joints $138'$, $138^2$, $138^3$ and $138^4$ could also be arranged in a manner similar to the arrangement of the hinged supports 100, 102, 104 and 106 in FIG. 7, that is, the transverse axes of the joints $138'$ and $138^3$ could be coaxial and lie on the same side of a first plane passing through the axis X—X in the manner of the supports 102 and 106, and similarly, the transverse axes of the joints $138^2$ and $138^4$ could also be coaxial and lie on the same side of a second plane passing through the axis X—X in the manner of the hinged supports 100 and 104.

From the foregoing, it is evident that I have devised a novel steering arrangement in a reaction propulsion motor which employs a support axis offset relative to the thrust axis to load an actuator in one direction only. The advantages are, among others, (1) a simplification in actuator structure, (2) elimination of play in joints, producing greater sensitivity, and (3) lighter structural possibilities.

It will be evident that numerous variations in details may be made without departing from the scope of the invention as defined in the following claims.

I claim:

1. A dirigible reaction propulsion motor, including: a combustion chamber and a coaxial reaction nozzle; a pivotal support attached to a body to be propelled by said motor, said pivotal support having an axis extending normal with reference to the axis of said motor, said support being connected with said motor at a point laterally offset to one side of the thrust axis of said motor; and an actuating means, attached to said body and connected with said motor at a point laterally offset to the other side of said motor thrust axis, to shift said motor axis to vary the direction of thrust relative to the propelled body.

2. A dirigible reaction motor as defined in claim 1, in which said pivotal support is connected with a wall of said combustion chamber and said actuating means is connected with a wall of said reaction nozzle.

3. A dirigible reaction motor as defined in claim 1, in which said pivotal support is connected with a wall of said reaction nozzle and said actuating means is connected with a wall of said combustion chamber.

4. A dirigible reaction motor as defined in claim 1, in which said actuating means is single acting and is so disposed that the reaction force of the motor with respect to the pivotal support opposes the actuating force.

5. A dirigible reaction propulsion motor, including: a combustion chamber and a reaction nozzle; a pivotal support attached to a body to be propelled by said motor and pivotally connected with said motor at a point laterally offset to one side of the thrust axis of the motor; and a single acting actuator attached to said body and pivotally connected with said motor at a point laterally offset to one side of said thrust axis, to shift said thrust axis to vary the direction of thrust relative to the propelled body, said actuator being so disposed that the reaction force of the motor with respect to the pivotal support opposes the actuator force.

6. A dirigible reaction propulsion motor, including: a combustion chamber having a longitudinal axis and a main reaction nozzle having a longitudinal axis, the axes being parallel and laterally offset from one another; a pivotal support attached to a body to be propelled by said motor and pivotally connected with a wall of said combustion chamber for pivotally mounting said motor for movement about an axis normal to and intersecting the longitudinal axis of the combustion chamber; and actuating means attached to said body and pivotally connected with said motor to shift the thrust axis of the motor to vary the direction of thrust relative to the propelled body.

7. A dirigible reaction propulsion motor as defined in claim 6, in which at least a portion of the combustion chamber wall is spherical, and in which said pivotal support includes a socket engaging said spherical wall to provide a ball-and-socket joint.

8. A steering arrangement for a reaction propulsion motor, including: a combustion chamber having a fore-and-aft axis and a plurality of reaction propulsion nozzles mounted on a rear wall of said combustion chamber, said nozzles being arranged in pairs in planes which pass through the fore-and-aft axis of the combustion chamber and which planes are normal to one another, the nozzles, in each pair, being on opposite sides of a diametral axial plane; a pivotal support including a cylinder and cylindrical socket joint connecting each nozzle with the combustion chamber, the pivotal supports for each pair in one plane being parallel with each other and normal to the pivotal supports for the pair in the other plane and normal to the longitudinal axis of the respective nozzle; and single acting actuating means attached to a wall of said combustion chamber and connected with said nozzles for moving said nozzles about their respective pivotal supports, whereby the direction of the axes of the nozzles relative to the fore-and-aft axis of the motor may be varied and the reaction motor may be steered in any direction, said actuating means being so disposed that the reactive force of the motor with respect to the pivotal support of the nozzles opposes the actuating force.

9. A steering arrangement for a reaction propulsion motor including a combustion chamber having a fore and aft axis and a plurality of reaction propulsion nozzles mounted on a rear wall of said combustion chamber, said nozzles arranged in pairs in planes which pass through the fore and aft axis of the combustion chamber and which planes are normal to each other, the nozzles, in each pair, being on opposite sides of said axis; a pivotal support including a cylinder and cylindrical socket joint connecting each nozzle to the combustion chamber, the pivotal supports for each pair in one plane being parallel with each other and normal to the pivotal supports for the pair in the other plane and normal to the longitudinal axis of the respective nozzle; and actuating means attached to a wall of said combustion chamber and connected to said nozzles for movement of said nozzles about their respective pivotal supports, whereby the direction of the axes of the nozzles relative to the longitudinal axis of the motor may be varied to steer the reaction propulsion motor in any direction.

10. A dirigible reaction motor, comprising: a combustion chamber and a reaction nozzle; means pivotally supporting said motor from a body to be propelled including a universal joint laterally offset to one side of the thrust axis of said motor; and a pair of actuating means attached to said body to be propelled and connected with said motor, the connection of the actuating means with the motor including a ring spaced from the outer walls of said motor and lying in a plane normal to the thrust axis of the motor, said actuating means being disposed in planes arranged 90° apart passing through the universal joint and parallel with the thrust axis, and the thrust axis disposed within the 90° angle, whereby the thrust axis of the motor may be shifted to vary the direction of the thrust relative to the propelled body.

11. A dirigible reaction propulsion motor, comprising: a combustion chamber and a reaction nozzle; means pivotally supporting said motor from a body to be propelled including a universal joint laterally offset to one side of the thrust axis of said motor; and a pair of actuating means attached to said body to be propelled and connected with said motor, said actuating means being single acting and so disposed that the reaction force of the motor with respect to the universal joint opposes the actuating force, said actuating means being disposed in planes arranged 90° apart passing through the universal joint and parallel with the thrust axis, and the thrust axis being disposed within the 90° angle, whereby the thrust axis of the motor may be shifted to vary the direction of the thrust relative to the propelled body.

12. A dirigible reaction propulsion motor, including: a combustion chamber having a longitudinal axis and a reaction nozzle having a longitudinal axis, the axes being parallel and laterally offset relative from one another; a pivotal support attached to a body to be propelled by said motor and pivotally connected with a wall of said combustion chamber for pivotally mounting said motor for movement about an axis normal to and intersecting the longitudinal axis of the combustion chamber; and actuating means attached to said body and pivotally connected with said motor to shift the thrust axis of the motor to vary the direction of thrust relative to the propelled body, said actuating means being single acting and so disposed that the reaction force of the motor with respect to the pivotal support opposes the actuating force.

13. A dirigible reaction propulsion motor, including: a combustion chamber having a longitudinal axis and a reaction nozzle having a longitudinal axis, the axes being parallel and laterally offset from one another; a pivotal support attached to a body to be propelled by said motor and pivotally connected with a wall of said combustion chamber for pivotally mounting said motor for movement about an axis normal to and intersecting the longitudinal axis of the combustion chamber; and actuating means attached to said body and pivotally connected with said motor to shift the thrust axis of the motor to vary the direction of thrust relative to the propelled body, said actuating means including a pair of single acting means pivotally connected with said motor at points spaced 90° apart, said actuating means being so disposed that the reactive force of the motor with respect to the pivotal support opposes the actuating force.

References Cited in the file of this patent

UNITED STATES PATENTS

| | | |
|---|---|---|
| 1,742,461 | Cuddy | Jan. 7, 1930 |
| 2,472,839 | Kramer | June 14, 1949 |
| 2,486,272 | Gazda | Oct. 25, 1949 |
| 2,598,544 | Holman | May 27, 1952 |
| 2,639,582 | Pearlman | May 26, 1953 |
| 2,664,700 | Benoit | Jan. 5, 1954 |
| 2,677,931 | Prieto | May 11, 1954 |
| 2,770,095 | Ashwood | Nov. 13, 1956 |
| 2,850,977 | Pollak | Sept. 9, 1958 |
| 2,865,579 | Caillette | Dec. 23, 1958 |
| 2,919,546 | David | Jan. 5, 1960 |
| 2,928,238 | Hawkins | Mar. 15, 1960 |
| 2,938,459 | McGraw et al. | May 31, 1960 |
| 2,981,501 | Schaefer | Apr. 25, 1961 |

FOREIGN PATENTS

| | | |
|---|---|---|
| 968,948 | France | May 10, 1950 |
| 727,255 | Great Britain | Mar. 30, 1955 |

OTHER REFERENCES

Rocket Encyclopedia Illustrated, page 204, published by Aero Publishers, Inc. (Herrick, Burgess and Lanford—Ed.), Los Angeles, Calif., April 28, 1959.